J. GRABER.
CARBONIC ACID GAS GENERATOR.

No. 176,621.                                   Patented April 25, 1876.

UNITED STATES PATENT OFFICE.

JOHN GRABER, OF BUFFALO, NEW YORK.

IMPROVEMENT IN CARBONIC-ACID-GAS GENERATORS.

Specification forming part of Letters Patent No. 176,621, dated April 25, 1876; application filed March 2, 1876.

*To all whom it may concern:*

Be it known that I, JOHN GRABER, of the city of Buffalo, in the county of Erie and State of New York, have invented certain new and useful Improvements in Apparatus for Generating Carbonic-Acid Gas, which improvements are fully set forth in the following specification, reference being had to the accompanying drawing.

My invention relates to that class of carbonic-acid-gas generators which are employed for charging malt liquors, such as beer, ale, &c., with carbonic-acid gas under a suitable pressure, so as to prevent such liquors from becoming stale and unpalatable by the escape of the gas originally contained therein.

My invention consists in the peculiar construction of the apparatus, so as to be cheap, compact, gas-tight, and capable of being readily taken apart when required, as will be hereinafter more fully set forth.

Figure 1:
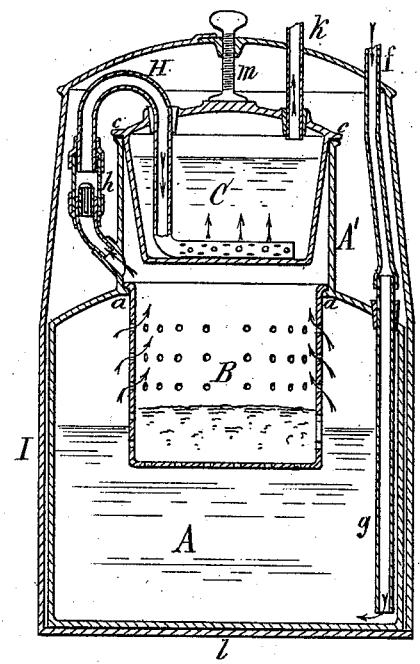
Figure 2:
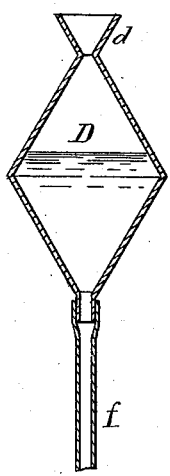
Figure 3:
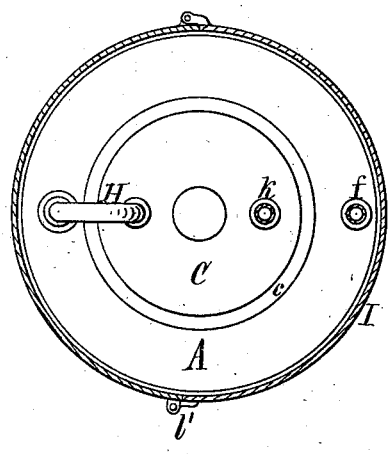
Figure 4:
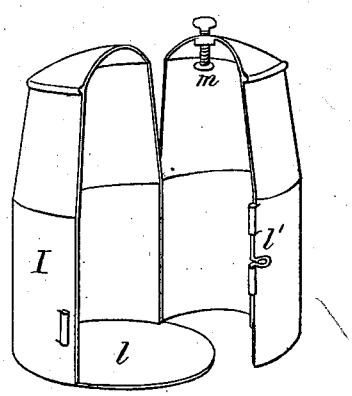

In the accompanying drawing, Figure 1 is a sectional elevation of an apparatus provided with my improvements. Fig. 2 is a vertical section of the acid-reservoir. Fig. 3 is a top-plan view with the inclosing-case in section. Fig. 4 is a perspective view of the inclosing-case.

Like letters of reference refer to like parts in each of the figures.

A represents the principal vessel of the apparatus, consisting of a lower cylindrical portion and an upper contracted neck-portion, A', formed in one piece with the former. B represents the alkali-receptacle, of cylindrical form, provided with a projecting rim at its upper end, with which it rests upon a flange, $a$, formed at the lower end of the neck portion A' of the vessel A, so as to depend into the latter. The bottom and sides of the alkali-receptacle are provided with perforations, as clearly shown in the drawing. C represents the washing-vessel arranged within the neck A' of the vessel A, and resting upon the top thereof by means of a flange, $c$. The vessel C is preferably made tapering downwardly to better confine the sediment at the bottom, and present at the top a larger body of pure water for the gas to pass through. D represents the acid-reservoir, made in the form of a double hollow cone, or tapering from its middle toward both ends, and provided at the top with a funnel, $d$, for facilitating the introduction of the acid. The reservoir D is arranged at any desired height above the bottom of the apparatus, and made of sufficient size to hold about the quantity of acid required for charging the apparatus. The opening in the lower end of the reservoir D is connected, by means of a rubber tube, $f$, with a glass tube, $g$, arranged in the vessel A reaching nearly to the bottom thereof. H represents the pipe for conducting the gas from the vessel A to the washing-vessel C. It is connected to a nozzle formed with the neck A' of the main vessel, and dives with its opposite end into the washing-vessel, the portion of the pipe laying on the bottom of the vessel being perforated, so as to emit the gas in small streams, instead of in large bubbles, as it will when provided with an opening at the end only, thereby bringing the gas in close contact with the washing medium, and producing a greater purification of the gas. $h$ represents a check-valve arranged in the pipe H, so as to prevent the washing material from being forced into the main vessel A, when, by a sudden stoppage of the generation of gas, the pressure in the main vessel should become less than the pressure in the washing-vessel. The valve $h$ is constructed of glass, silver, or other suitable material, which is not reacted upon by the acid employed. $k$ represents the gas-escape pipe leading from the top of the washing-vessel to the barrel or cask containing the liquor. The main vessel A and acid-reservoir D are preferably constructed of glass, and the alkali-receptacle B and washing-vessel C of glazed burned clay or porcelain; but any other suitable material may be employed. I represents an inclosing-case constructed of metal, preferably of cast-iron, for protecting the apparatus. It is constructed in halves hinged together, as clearly shown in Fig. 4, the bottom $l$ being attached to one of the halves, and the halves being secured together by a suitable locking device, $l'$. $m$ is a vertical set-screw working in a threaded socket in top of the case L, and bearing upon the washing-vessel C, so as to press the latter upon the top of the neck of the vessel A. A packing-ring of rubber, or other suitable material, is placed between the flange of the vessel C and the top of the neck A', so that this joint is readily made gas-tight by the pressure of the screw m. Upon releasing the screw m and opening the case I the apparatus is readily taken apart for cleaning and recharging the same. By raising and lowering the acid-reservoir the pressure which the apparatus will produce is increased and lessened, the reservoir D being supported in any suitable manner.

The washing-vessel is charged with water, or, preferably, a solution of bicarbonate of soda, and the vessel B with marble dust or chips, when the two vessels are arranged in the vessel A and the screw m applied, rendering the top joint-tight. Muriatic acid is then introduced into the reservoir D, the acid entering the vessel A through the pipes $f$ $g$ until the acid in the vessel D stands at the center thereof. The acid in the vessel A enters the vessel B through the perforations in its bottom, when the generation of carbonic acid gas commences. The increasing gas-pressure in the vessel A depresses the level of the acid therein, and forces the acid back through the pipes $f$ $g$ into the reservoir D until the contact of the acid with the vessel B is broken, when the generation of gas ceases. When beer is drawn from the cask, the gas-pressure in the vessel A is lowered, permitting the acid to rise again, and to come in contact with the material in the vessel B, when the generation of gas recommences. The gas passes from the vessel A through the perforations of the vessel B into the latter, and thence through the pipe H into the washing-vessel C, whence it escapes through the pipe $k$. The upwardly-contracted form of the acid-reservoir D prevents the acid contained therein from exhaling any vapors while permitting the acid to be readily introduced.

What I claim as my invention is—

1. The combination, with the main vessel A, provided with contracted neck A' and inner flange $a$, of the perforated alkali-vessel B and washing-vessel C, resting respectively upon the rim $a$ and top of neck A', so as to be readily removable, substantially as hereinbefore set forth.

2. The combination, with a carbonic-acid gas-generator, of the acid-receptacle D, composed of a double conical body and funnel $d$, substantially as and for the purpose hereinbefore set forth.

3. The combination, with the generating-vessel A A' and removable vessel C, of the inclosing-case I, provided with set-screw $m$, substantially as and for the purpose hereinbefore set forth.

JOHN GRABER.

Witnesses:
EDWARD WILHELM,
CHAS. J. BUCHHEIT.